US012530961B2

(12) United States Patent
Park et al.

(10) Patent No.: US 12,530,961 B2
(45) Date of Patent: Jan. 20, 2026

(54) METHOD AND SYSTEM FOR PROVIDING TRAFFIC ACCIDENT INFORMATION

(71) Applicant: HYUNDAI MOBIS CO., LTD., Seoul (KR)

(72) Inventors: Ki Hee Park, Gwacheon-si (KR); Yeong Hun Park, Seoul (KR); Yu Jin Jung, Seoul (KR); June Seung Lee, Gunpo-si (KR); Hyun Jun Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 189 days.

(21) Appl. No.: 18/351,611

(22) Filed: Jul. 13, 2023

(65) Prior Publication Data

US 2024/0096209 A1 Mar. 21, 2024

(30) Foreign Application Priority Data

Sep. 21, 2022 (KR) .......................... 10-2022-0119147

(51) Int. Cl.
*G08G 1/01* (2006.01)
*G08G 1/09* (2006.01)
*G08G 1/0967* (2006.01)
*H04W 4/44* (2018.01)

(52) U.S. Cl.
CPC ...... *G08G 1/0112* (2013.01); *G08G 1/096775* (2013.01); *H04W 4/44* (2018.02)

(58) Field of Classification Search
CPC ........... G08G 1/0112; G08G 1/096775; G08G 1/0133; G08G 1/0141; G08G 1/04; G08G 1/205; G08G 1/0137; G08G 1/091; H04W 4/44; H04W 4/40; G06Q 50/40; G06Q 50/10; G06Q 50/50; G08B 25/009
See application file for complete search history.

(56) References Cited

U.S. PATENT DOCUMENTS 9,842,496 B1 * 12/2017 Hayward ................ G01S 19/50

* cited by examiner

*Primary Examiner* — Rodney A Butler
(74) *Attorney, Agent, or Firm* — NSIP Law

(57) ABSTRACT

A system and method for providing a traffic accident handling service for a traffic accident are disclosed, where the method includes acquiring state information of a personal mobility device via a sensor and a camera of the personal mobility device, analyzing the traffic accident based on the acquired state information, receiving accident handling information corresponding to the traffic accident, and providing accident handling guide information based on the accident handling information.

20 Claims, 8 Drawing Sheets

METHOD AND SYSTEM FOR PROVIDING TRAFFIC ACCIDENT INFORMATION

CROSS-REFERENCE TO RELATED APPLICATIONS

This application claims the benefit under 35 U.S.C. § 119(a) of Korean Patent Application No. 10-2022-0119147, filed on Sep. 21, 2022, in the Korean Intellectual Property Office, the entire disclosure of which is incorporated herein by reference for all purposes.

BACKGROUND

1. Field

The following description relates to a method and a system for providing a traffic accident handling service, and specifically, to a method and a system for providing a traffic accident handling service that provide accident handling guide information based on state information acquired via a sensor and a camera of a personal mobility device where a traffic accident has occurred.

2. Discussion of Related Art

Because many people have and operate personal mobility devices, a traffic accident is inevitably accompanied. In general, in the event of the traffic accident, the occurrence of traffic accident and the injuries are reported via the emergency number 911. Further, to reduce many physical and mental damages caused by the traffic accident, users of the personal mobility devices purchase insurance.

Controversy may arise as to which driver is at fault in relation to insurance processing in case of the traffic accident. In this case, a victim of the traffic accident generally files a case with an insurance company. Then, the insurance company designates a person in charge of the received traffic accident, and the person in charge is dispatched to the site of the traffic accident to calculate a percentage of fault via an accident detail, a damage situation, an interview with the user of the personal mobility device, analysis of an accident video recorded on a black box, and the like. Then, there are processes of calculating and paying insurance money based on the calculated percentage of fault.

However, such effort of the insurance company to handle the traffic accident is a decisive factor that inevitably sets an insurance premium high. In addition, when calculating the percentage of fault based on subjective judgment of the person in charge, there is a limit to making a consistent and objective judgment in traffic accidents in similar situations.

In addition, when the traffic accident occurs, there is a high risk of a secondary accident resulted from approach of a following personal mobility device. Therefore, there are cases in which it is necessary to quickly escape from the site of the traffic accident. However, because of the traffic accident, it is difficult for a driver of the personal mobility device to make a rational judgment due to shock at a time of the accident, making it difficult to take appropriate measures. Therefore, there is a problem that additional human casualties occur accordingly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method for providing a traffic accident handling service for a traffic accident, the method including acquiring state information of a personal mobility device via a sensor and a camera of the personal mobility device, analyzing the traffic accident based on the acquired state information, receiving accident handling information corresponding to the traffic accident, and providing accident handling guide information based on the accident handling information.

The accident handling guide information may include at least one of percentage of fault calculation information or accident response guide information.

The accident response guide information may include information for moving away from a location where the traffic accident has occurred to a safe zone.

The accident response guide information may include information notifying whether a following personal mobility device is approaching a location where the traffic accident occurred.

The similar accident handling information may include information transmitted from a central management server where information on handling of a previously occurred traffic accidents are stored.

The state information of the personal mobility device may include impact level information of the personal mobility device calculated via the sensor.

The state information of the personal mobility device may include location change information of the personal mobility device acquired via the sensor.

The state information of the personal mobility device may include image information of an area around the personal mobility device obtained via the camera.

The state information of the personal mobility device may include information on autonomous driving of the personal mobility device.

The information on the autonomous driving may include at least one of information on whether the personal mobility device is driven autonomously or information on an autonomous driving level of the personal mobility device.

The method may include transmitting one or more of traffic accident occurrence information, location information corresponding to the traffic accident occurrence information, and the accident handling guide information via wireless communication.

The wireless communication may include at least one of a vehicle to infrastructure (V2I) scheme or a vehicle to infrastructure (V2X) scheme, wherein the traffic accident occurrence information, the location information corresponding to the traffic accident occurrence information, and the accident handling guide information may be transmitted to an infrastructure facility including a road control center in the V2I scheme, and wherein the traffic accident occurrence information and the location information corresponding to the traffic accident occurrence information may be transmitted to a communication module of a following personal mobility device in the V2X scheme.

The sensor of the personal mobility device may include one or more of a bumper sensor, an airbag sensor, a tilt sensor, a lidar sensor, and a GPS sensor, and wherein the personal mobility device may include at least one of a vehicle, a robot, or a bike.

In another general aspect, there is provided a system for providing a traffic accident handling service, the system including a sensor and a camera disposed in a personal mobility device, and a processor configured to analyze a traffic accident based on state information of the personal mobility device acquired via the sensor and the camera of the personal mobility device, receive accident handling information corresponding to the traffic accident, and provide accident handling guide information based on the accident handling information.

The accident handling guide information may include at least one of percentage of fault calculation information or accident response guide information.

The accident response guide information may include at least one of information for moving away from a location where the traffic accident occurred to a safe zone or information for notifying whether a following personal mobility device is approaching the location where the traffic accident occurred.

The accident handling information may include information transmitted from a central management server where information on handling of a previously occurred traffic accidents are stored.

The state information of the personal mobility device may include at least one of impact level information of the personal mobility device calculated via the sensor, location change information of the personal mobility device acquired via the sensor, image information of an area around the personal mobility device filmed via the camera, or information on autonomous driving of the personal mobility device.

The system of claim 18, wherein the information on the autonomous driving may include at least one of information on whether the personal mobility device is driven autonomously or information on an autonomous driving level of the personal mobility device.

The system of claim 14, may include a wireless communication transceiver configured to transmit one or more of traffic accident occurrence information, location information corresponding to the traffic accident occurrence information, and the accident handling guide information via wireless communication.

Other features and aspects will be apparent from the following detailed description, the drawings, and the claims.

Figure 1:
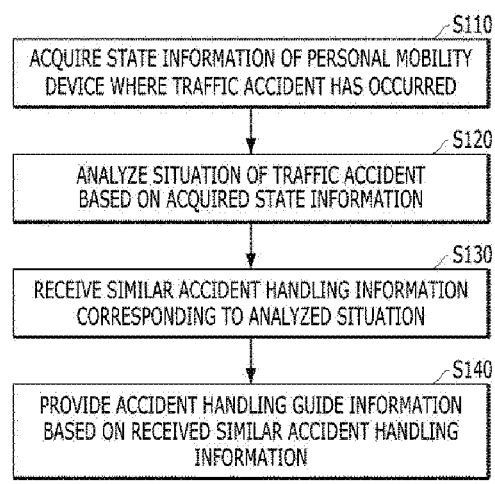
FIG. 1 is a diagram for illustrating a method for providing a traffic accident handling service according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms including ordinal numbers, such as first, second, and the like, may be used to describe various components, the components are not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

FIG. 1 is a diagram for illustrating a method for providing a traffic accident handling service according to an embodiment of the present disclosure.

First, state information of a personal mobility device where a traffic accident has occurred may be acquired (S110). In this regard, the state information of the personal mobility device may be acquired via a sensor and a camera located in the personal mobility device.

In this regard, the personal mobility device does not need to be limited to a vehicle, includes various personal mobility devices providing improved riding comfort via a suspension function, easy wheel control, and the like as a means of transportation, and includes a robot, a bike, and the like.

A situation of the traffic accident may be analyzed based on the state information acquired via the sensor and the camera of the personal mobility device (S120). In this regard, the analyzing of the situation of the traffic accident may include analyzing whether it is a minor accident between personal mobility devices, whether it is a serious accident with external or internal damage to the personal mobility device, and whether it is an accident between personal mobility devices where autonomous driving is possible.

More specifically, the analyzing of the situation of the traffic accident may include analyzing whether it is an accident that has occurred when one personal mobility device suddenly overtakes a preceding personal mobility device by violating a center line from the same lane, whether it is an accident that has occurred when one personal mobility device makes a left turn in a straight lane while a personal mobility device next to the personal mobility device is moving straight, whether it is an accident that has occurred when a vehicle invades a bicycle-only road, whether it is an accident that has occurred when one personal mobility device entering a roundabout collides with another personal mobility device already turning within the roundabout, and whether it is an accident that has occurred at a cross-shaped intersection.

Then, similar accident handling information corresponding to the analyzed situation may be received (S130). In this regard, the similar accident handling information may include information transmitted from a central management server where information on handling of a traffic accident that occurred previously is stored.

Accident handling guide information may be provided based on the received similar accident handling information (S140). In this regard, the accident handling guide information may include at least one of percentage of fault calculation information or accident response guide information. In addition, the accident response guide information may include information for guiding movement away from a location where the traffic accident has occurred to a safe zone, and information for notifying that there is a following personal mobility device approaching the location where the traffic accident has occurred.

Accordingly, the method for providing the traffic accident handling service according to an embodiment of the present disclosure may secure objectivity of percentage of fault calculation via objective and quantitative judgment criteria based on the similar accident handling information, and may prevent a secondary accident that may additionally occur at the location where the traffic accident has occurred with the accident response guide information in advance.

Figure 2:
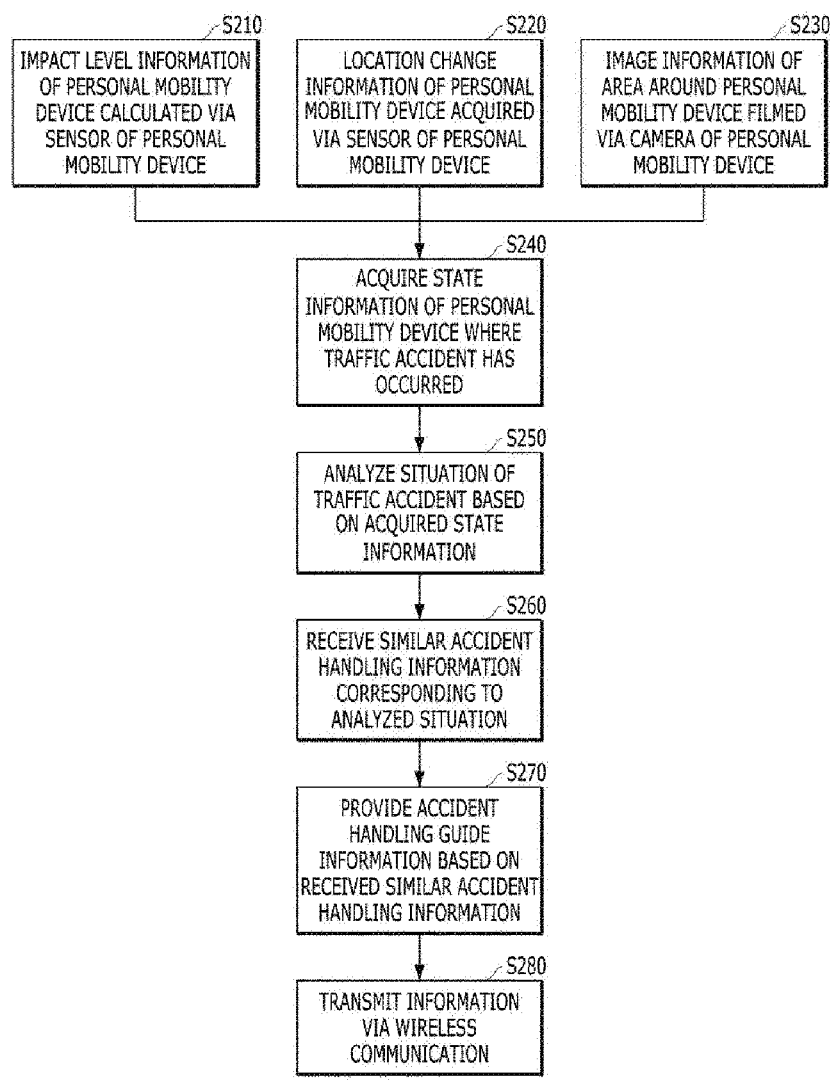
FIG. 2 is a diagram for illustrating a method for acquiring state information of a personal mobility device where a traffic accident has occurred in a method for providing a traffic accident handling service according to an embodiment of the present disclosure.

FIG. 2 is a diagram for illustrating a method for acquiring state information of a personal mobility device where a traffic accident has occurred in a method for providing a traffic accident handling service according to an embodiment of the present disclosure.

Impact level information of the personal mobility device calculated via the sensor of the personal mobility device where the traffic accident has occurred may be acquired (S210). In this regard, the sensor of the personal mobility device that calculates the impact level information of the personal mobility device may include sensors located in the personal mobility device, such as a bumper sensor, an airbag sensor, a tilt sensor, and a lidar sensor.

In addition, location change information of the personal mobility device acquired via the sensor of the personal mobility device where the traffic accident has occurred may be acquired (S220). In this regard, the location change information of the personal mobility device may be acquired via a GPS sensor of the personal mobility device using a signal sent from a GPS satellite.

In addition, image information of an area around the personal mobility device filmed via the camera of the personal mobility device where the traffic accident has occurred may be acquired (S230). In this regard, the camera of the personal mobility device that films the image information of the area around the personal mobility device may include cameras located in the personal mobility device, such as a camera for a surround view monitor (SVM) and a built-in cam. The image information of the area around the personal mobility device may include information on a surrounding traffic condition, a location of the center line, presence or absence of a road marking for a straight movement or a left turn, a location of traffic light, and a location of a CCTV.

The impact level information of the personal mobility device, the location change information of the personal mobility device, and the image information of the area around the personal mobility device may be acquired as the state information of the personal mobility device where the traffic accident has occurred via the above-described sensor and camera of the personal mobility device (S240). Then, the situation of the traffic accident may be analyzed based on the acquired state information (S250), the similar accident handling information corresponding to the analyzed situation may be received (S260), and the accident handling guide information may be provided based on the received similar accident handling information (S270).

In addition, traffic accident occurrence information, location information corresponding to the traffic accident occurrence information, and the accident handling guide information may be transmitted via wireless communication (S280). In this regard, the wireless communication may include a vehicle to everything (V2X) scheme. In addition, the communication of the V2X scheme includes a vehicle to infrastructure (V2I) scheme and a vehicle to vehicle (V2V) scheme, which will be described in more detail below.

Figure 3:
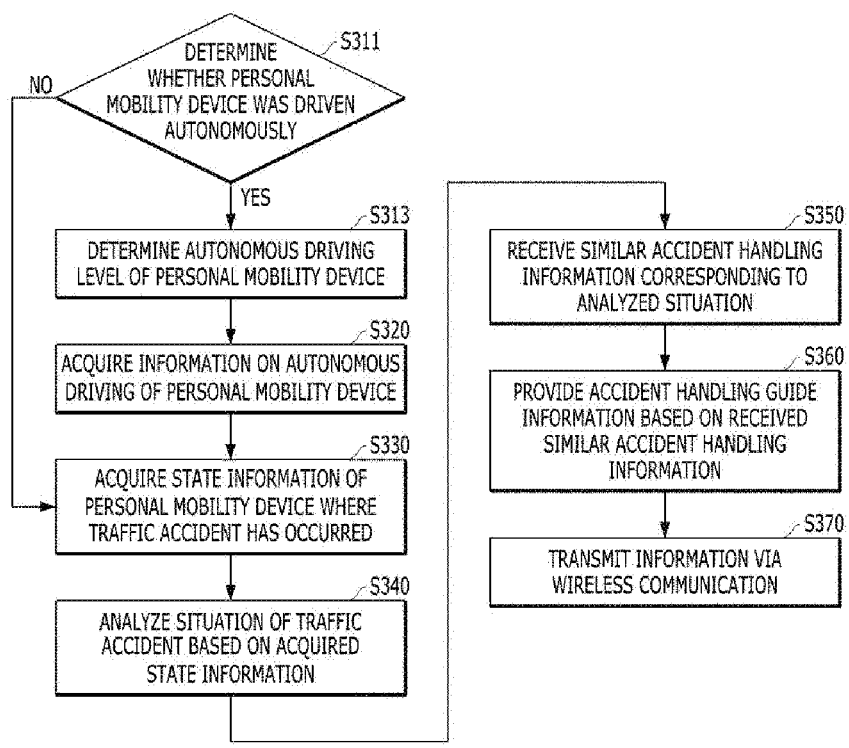
FIG. 3 is a diagram for illustrating a method for acquiring information on autonomous driving of a personal mobility device where a traffic accident has occurred in a method for providing a traffic accident handling service according to an embodiment of the present disclosure.

FIG. 3 is a diagram for illustrating a method for acquiring information on autonomous driving of a personal mobility device where a traffic accident has occurred in a method for providing a traffic accident handling service according to an embodiment of the present disclosure.

First, the method for providing the traffic accident handling service according to the present disclosure may determine whether the personal mobility device was driven autonomously (S311). In addition, when it is determined that the personal mobility device where the traffic accident has occurred was driven autonomously at a time of the traffic accident, an autonomous driving level may be determined (S313).

In this regard, in relation to the autonomous driving level, the Society of Automotive Engineers (SAE), the American Society of Automotive Engineers, subdivides the autonomous driving levels into five levels, from level 0 to level 5, for example, as follows.

Level 0 (no automation) is a stage in which a driver controls and takes responsibility for everything in driving. The driver drives all the time, and a system of a vehicle performs only auxiliary functions such as emergency notification. This is a level at which a subject of the driving control is human, and the human performs variable detection and takes the responsibility for the driving.

Level 1 (driver assistance) is a stage of assisting the driver via adaptive cruise control and lane keeping functions. When activated, the system assists the driver by maintaining a speed of the vehicle, an inter-vehicle distance, and the lane. This is a level at which the subjects of the driving control are the human and the system, but the human performs the variable detection and takes the responsibility for the driving.

Level 2 (partial automation) is a stage in which the vehicle and the human may control steering and acceleration/deceleration of the vehicle at the same time for a certain period of time under specific conditions. Steering on a gentle curve and assisted driving to maintain a distance from a preceding vehicle are possible. However, this is a level at which the human performs the variable detection and takes the responsibility for the driving. The driver always needs to monitor a driving situation, and the driver must immediately intervene in driving in a situation that the system does not recognize or the like.

Level 3 (partial automation) is a level at which the system takes charge of driving in sections under specific conditions, such as a highway, and the driver intervenes only in case of danger. The system performs the driving control and the variable detection during the driving, and the monitoring is not required unlike the level 2. However, in a case of a situation beyond requirements of the system, the system requests the immediate intervention of the driver.

At level 4 (high automation), the autonomous driving is possible on most roads. The system performs the driving control and takes responsibility for the driving. The intervention of the driver is unnecessary on most roads except for restricted situations. However, because the intervention of the driver may be requested under specific conditions such as bad weather, a device for controlling the driving via the human is required.

Level 5 (full automation) is a stage in which the driver is not required and the driving is possible with only a passenger. The passenger only inputs a destination, and the system takes charge of the driving in all conditions. At the level 5, control devices for the steering, the acceleration, and the deceleration of the vehicle are unnecessary.

In the method for providing the traffic accident handling service according to the present disclosure, the autonomous driving level may be determined, for example, the autonomous driving levels may be classified into levels equal to or lower than 3 and levels equal to or higher than 4, and information on the autonomous driving of the personal mobility device may be acquired (S320).

In addition, the state information of the personal mobility device where the traffic accident has occurred including the information on the autonomous driving may be acquired (S330). In addition, when it is determined in S311 that the personal mobility device was not driven autonomously at the time of the traffic accident, the state information of the personal mobility device may be acquired via the above-described sensor and camera of the personal mobility device.

Then, the situation of the traffic accident may be analyzed based on the acquired state information (S340), the similar accident handling information corresponding to the analyzed situation may be received (S350), and the accident handling guide information may be provided based on the received similar accident handling information (S360). In addition, the traffic accident occurrence information, the location information corresponding to the traffic accident occurrence information, and the accident handling guide information may be transmitted via the wireless communication (S370).

Figure 4:
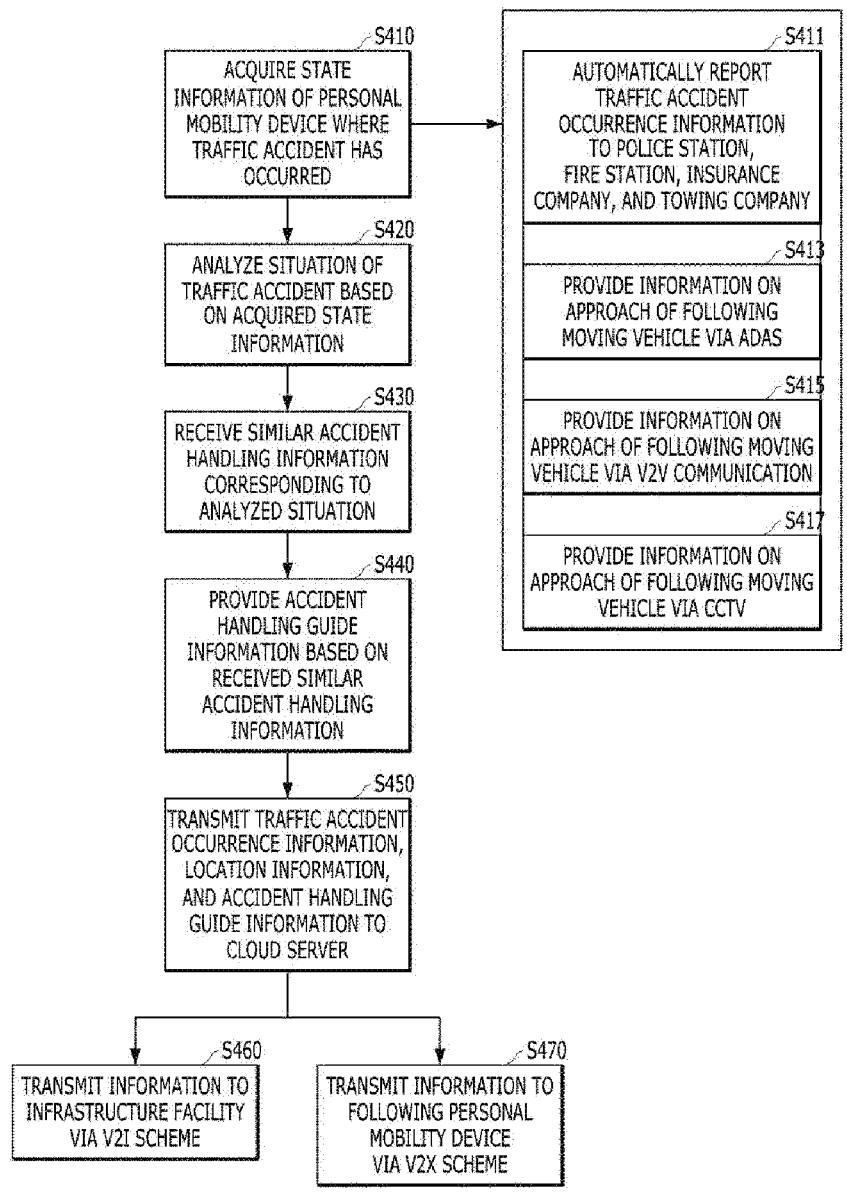
FIG. 4 is a diagram for illustrating another embodiment of a method for providing a traffic accident handling service according to the present disclosure.

FIG. 4 is a diagram for illustrating another embodiment of a method for providing a traffic accident handling service according to the present disclosure.

The state information of the personal mobility device may be acquired via the sensor and the camera of the personal mobility device where the traffic accident has occurred (S410). In addition, the traffic accident occurrence information may be automatically reported to a police station, a fire station, an insurance company, a towing company, and the like (S411).

In addition, information on approach of a following moving vehicle may be provided via advanced driver assistance systems (ADAS) (S413), the information on the approach of the following moving vehicle may be provided via the V2V communication (S415), or the information on the approach of the following moving vehicle may be provided via the CCTV (S417). Such information on the approach of the following moving vehicle may be provided via a screen or sound output on a navigation system of the personal mobility device where the traffic accident has occurred. Accordingly, the secondary accident that may additionally occur at the location where the traffic accident has occurred may be prevented in advance.

Then, the situation of the traffic accident may be analyzed based on the acquired state information (S420), the similar accident handling information corresponding to the analyzed situation may be received (S430), and the accident handling guide information may be provided based on the received similar accident handling information (S440). In addition, the traffic accident occurrence information, the location information corresponding to the traffic accident occurrence information, and the accident handling guide information may be transmitted to a cloud server (S450). Then, the traffic accident occurrence information, the location information corresponding to the traffic accident occurrence information, and the accident handling guide information may be transmitted to an infrastructure facility including a road control center via the V2I scheme (S460). In addition, the traffic accident occurrence information and the location information corresponding to traffic accident occurrence information may be transmitted to the following personal mobility device via the V2X scheme (S470).

Figure 5:
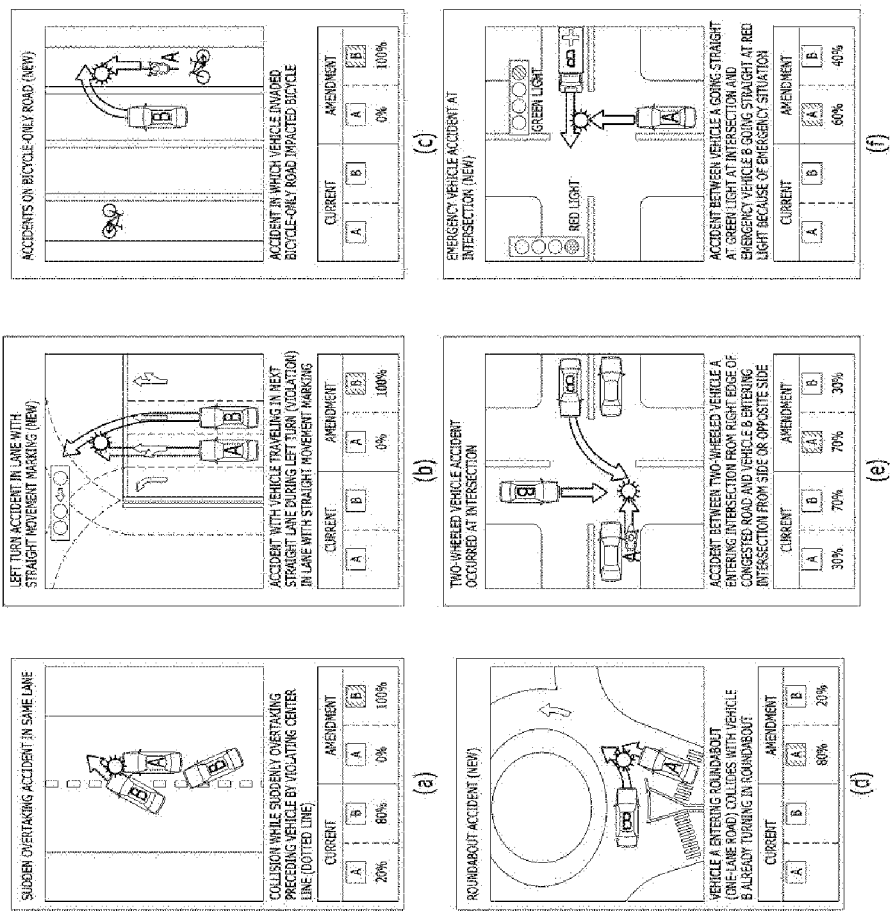
FIG. 5 is a diagram for illustrating percentage of fault calculation in a method for providing a traffic accident handling service according to an embodiment of the present disclosure.

FIG. 5 is a diagram for illustrating percentage of fault calculation in a method for providing a traffic accident handling service according to an embodiment of the present disclosure.

In the method for providing the traffic accident handling service according to the present disclosure, the situation of the above-described traffic accident may be analyzed, and the similar accident handling information corresponding to the analyzed situation may be received from the central management server to calculate a percentage of fault based on the received similar accident handling information.

(a) in FIG. 5 is a diagram illustrating that similar accident handling information for a case in which the sudden overtaking accident occurred in the same lane is received, and a percentage of fault of a following vehicle B that caused a collision accident while overtaking a preceding vehicle A by violating the center line is currently calculated as 80%, but applied as 100% in amendment.

(b) in FIG. 5 is a diagram illustrating that similar accident handling information for a case in which the left turn accident occurred in the lane with the straight movement marking is received, and a percentage of fault of a left-turning vehicle B that caused a collision accident with a vehicle A in a next straight lane by turning left from the lane with the straight movement marking is applied as 100%.

(c) in FIG. 5 is a diagram illustrating that similar accident handling information for a case in which a bicycle-only road accident occurred is received, and a percentage of fault of a vehicle B invaded the bicycle-only road is applied as 100%.

(d) in FIG. 5 is a diagram illustrating that similar accident handling information for a case in which a roundabout accident occurred is received, and a percentage of fault of a vehicle A entering the roundabout that collided with a vehicle B already turning within the roundabout is calculated as 80%.

(e) in FIG. 5 is a diagram illustrating that similar accident handling information for a case in which a two-wheeled vehicle accident occurred at an intersection is received, and a percentage of fault of a vehicle B that enters the intersection from the side or an opposite side of a two-wheeled vehicle A entering the intersection from a right edge of a congested road and collides with the vehicle A is currently calculated as 70%, but calculated as 30% in the amendment.

(f) in FIG. 5 is a diagram illustrating that similar accident handling information for a case in which an emergency vehicle accident occurred at the intersection is received, and a percentage of fault of a vehicle B going straight at a red light because of an emergency situation and colliding with a vehicle A going straight at a green light at the intersection is calculated as 40%.

The method for providing the traffic accident handling service according to the present disclosure may receive the similar accident handling information and calculate the percentage of fault in situations other than the situations exemplified in FIG. 5. In addition, when there is a difference from the information on the handling of the traffic accident that occurred previously, the objectivity may be secured by calculating the percentage of fault via more objective and quantitative analysis of related precedents.

In addition, the content of analyzing the situation of the traffic accident and the similar accident handling information may be provided via a mobile terminal. In this regard, the mobile terminal may include a mobile phone, a smart phone, a laptop computer, a terminal for digital broadcasting, a personal digital assistant (PDA), a portable multimedia player (PMP), a navigation device, a slate PC, a tablet PC, an ultrabook, and a wearable device (for example, a watch-type terminal (a smartwatch), a glass-type terminal (a smart glass), and a head mounted display (HMD)), and the like.

Figure 6:
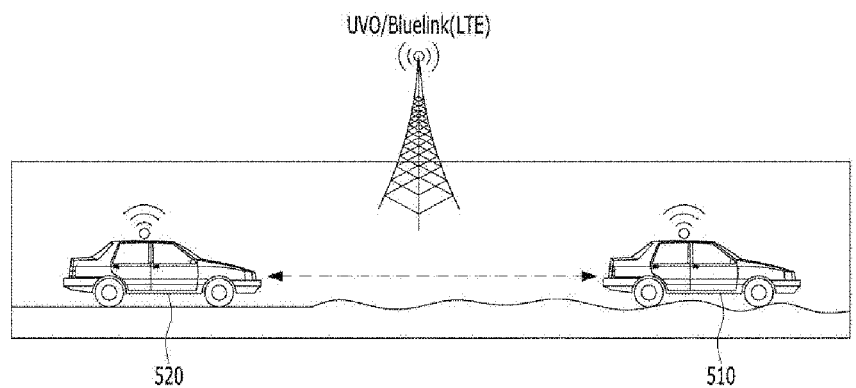
FIGS. 6 and 7 are diagrams for illustrating wireless communication in a method for providing a traffic accident handling service according to an embodiment of the present disclosure.
Figure 7:
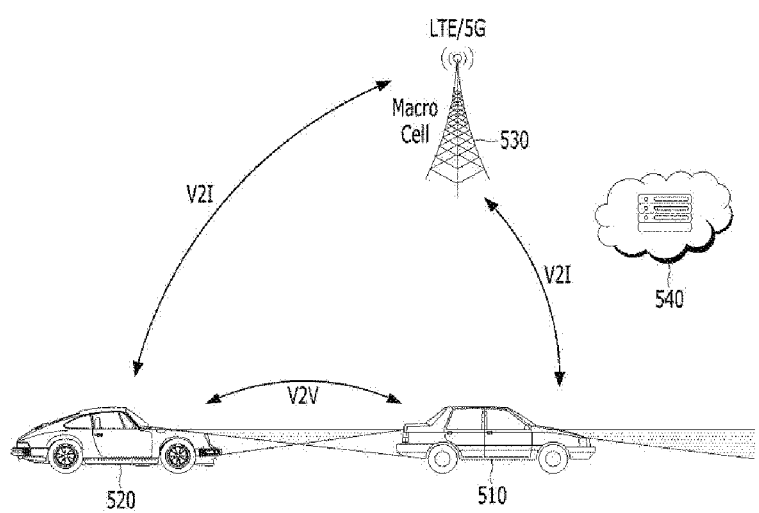

FIGS. 6 and 7 are diagrams for illustrating wireless communication in a method for providing a traffic accident handling service according to an embodiment of the present disclosure.

First, FIG. 6 shows a case in which locations of a vehicle 510 where the traffic accident has occurred and a following moving vehicle 520 approaching the location where the traffic accident has occurred are compared to each other, and when the vehicles are traveling within a predetermined distance, the vehicle 510 where the traffic accident has occurred provides the traffic accident occurrence information and information on the location where the traffic accident has occurred to the following moving vehicle 520 via direct communication in the V2V scheme. UVO/Blue Link (LTE) schemes may be used for the V2V communication scheme, and various V2V communication schemes may be used based on a standardized scheme.

On the other hand, FIG. 7 is an example of a case in which various V2X schemes are applied as well as a V2V scheme shown in FIG. 6.

For example, the vehicle 510 where the traffic accident has occurred may not exist within a predetermined distance (e.g., a range in which the direct communication is possible or a predetermined distance considering a vehicle speed limit) on a traveling path of the following moving vehicle 520. In addition, when driving at night, the occurrence of the traffic accident may not be recognized and a dangerous situation may occur. Accordingly, the traffic accident occurrence information actually acquired by a personal mobility device (not shown) that moved ahead on the path on the location where the traffic accident has occurred, and the location information corresponding to the traffic accident occurrence information may be transmitted to a server 540 in the V2I scheme and stored, and may be set to be provided in the V2I scheme via a base station 530 when the following moving vehicle 520 approaches the location where the traffic accident has occurred.

In one example, even in the case of FIG. 7, when the vehicle 510 where the traffic accident has occurred is within the predetermined distance from the following moving vehicle 520, the location information corresponding to the occurrence of the traffic accident may be quickly secured in the V2V scheme. However, due to variables that may occur in the service of the V2V scheme as described above, the following moving vehicle 520 may also be set to receive the information on the location where the traffic accident has occurred stored in the server 540 in the V2I scheme.

Figure 8:
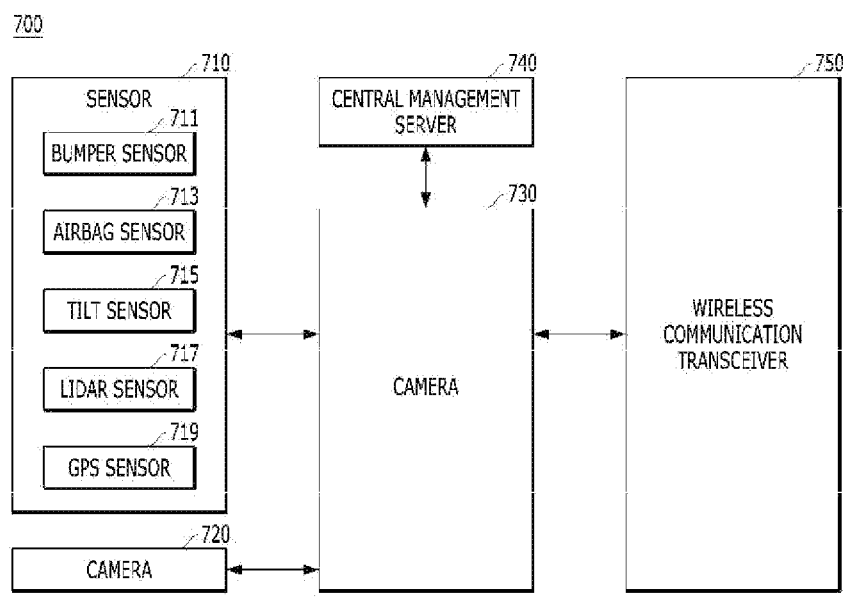
FIG. 8 is a block diagram of a system for providing a traffic accident handling service according to an embodiment of the present disclosure.

FIG. 8 is a block diagram of a system for providing a traffic accident handling service according to an embodiment of the present disclosure.

A traffic accident handling service providing system 700 according to the present disclosure may include a sensor 710, a camera 720, a processor 730, a central management server 740, and a wireless communication transceiver 750.

The sensor 710 may be located in the personal mobility device and acquire the state information of the personal mobility device. In this regard, the sensor 710 may include a bumper sensor 711, an airbag sensor 713, a tilt sensor 715, a lidar sensor 717, and a GPS sensor 719.

An impact level of the personal mobility device may be calculated via the sensor 710 located in the personal mobility device, such as the bumper sensor 711, the airbag sensor 713, the tilt sensor 715, and the lidar sensor 717 to acquire the state information of the mobility device. In addition, the location change information of the personal mobility device may be acquired via the GPS sensor 719 to acquire the state information of the personal mobility device.

The camera 720 may be located in the personal mobility device and acquire the state information of the personal mobility device. In this regard, the camera 720 may include the camera 720 located in the personal mobility device, such as the camera for the SVM or the built-in cam.

The image information of the area around the personal mobility device may include the information on the surrounding traffic condition, the location of the center line, the presence or the absence of the road marking for the straight movement or the left turn, the location of the traffic light, and the location of the CCTV.

In addition, the state information of the personal mobility device may include the information on the autonomous driving. Such information on the autonomous driving may include at least one of information on whether the personal mobility device is being driven autonomously and information on the autonomous driving level of the personal mobility device. For example, the information on the autonomous driving of the personal mobility device may be acquired by classifying the autonomous driving levels into the levels equal to or lower than 3 and the levels equal to or higher than 4.

The processor 730 may analyze the situation of the traffic accident based on the state information of the personal mobility device acquired via the sensor 710 and the camera 720 of the personal mobility device, receive the similar accident corresponding to the analyzed situation, and provide the accident handling guide information based on the received similar accident handling information.

In this regard, the analyzing of the situation of the traffic accident may include analyzing whether it is the minor accident between the personal mobility devices, whether it is the serious accident with the external or internal damage to the personal mobility device, and whether it is the accident between the personal mobility devices where the autonomous driving is possible.

More specifically, the analyzing of the situation of the traffic accident may include analyzing whether it is the accident that has occurred when one personal mobility device suddenly overtakes the preceding personal mobility device by violating the center line from the same lane, whether it is the accident that has occurred when one personal mobility device makes the left turn in the straight lane while the personal mobility device next to the personal mobility device is moving straight, whether it is the accident that has occurred when the vehicle invades the bicycle-only road, whether it is the accident that has occurred when one personal mobility device entering the roundabout collides with another personal mobility device already turning within the roundabout, and whether it is the accident that has occurred at the cross-shaped intersection.

The similar accident handling information corresponding to the analyzed situation may be information transmitted from the central management server 740. In this regard, the central management server 740 may store and transmit the information on the handling of the traffic accident that have occurred previously. In addition, the central management server 740 may calculate the objective percentage of fault based on the similar accident handling information described above.

The wireless communication transceiver 750 may transmit the traffic accident occurrence information, the location information corresponding to the traffic accident occurrence information, and the accident handling guide information via the wireless communication. In this regard, the wireless communication may transmit the traffic accident occurrence information, the location information corresponding to the traffic accident occurrence information, and the accident handling guide information to the infrastructure facility including the road control center in the V2I scheme. In addition, the wireless communication may transmit the traffic accident occurrence information and the location information corresponding to the traffic accident occurrence information to a communication module of the following personal mobility device in the V2X scheme.

Accordingly, the method and the system for providing the traffic accident handling service according to the present disclosure may acquire the state information of the personal mobility device via the sensor and the camera of the personal mobility device where the traffic accident has occurred and receive the similar accident handling information to secure the objectivity of the percentage of fault calculation via the objective and quantitative judgment criteria.

In addition, the method and system for providing the traffic accident handling service according to the present disclosure may transmit the traffic accident occurrence information and the location information corresponding to the traffic accident occurrence information to the infrastructure facility or the following moving vehicle to prevent the secondary accident, thereby preventing the accident that may occur additionally in advance.

The method and the system for providing the traffic accident handling service based on the state information of the personal mobility device where the traffic accident has occurred according to the embodiments of the present disclosure as described above may be utilized in the various smart mobility devices such as the robot and the bike as well as the vehicle.

The method and the system for providing the traffic accident handling service as described above may acquire state information of a personal mobility device via a sensor and a camera of the personal mobility device where a traffic accident has occurred and receive similar accident handling information to secure objectivity of percentage of fault calculation via objective and quantitative judgment criteria.

The method and the system for providing the traffic accident handling service as described above may transmit traffic accident occurrence information and location information corresponding to the traffic accident occurrence information to an infrastructure facility or a following moving vehicle to prevent a secondary accident so as to prevent an accident that may occur additionally in advance.

According to the method and the system for providing the traffic accident handling service as described above, the state information of the personal mobility device may be acquired via the sensor and the camera of the personal mobility device where the traffic accident has occurred, and the similar accident handling information may be received to secure the objectivity of the percentage of fault calculation via the objective and quantitative judgment criteria.

According to the method and the system for providing the traffic accident handling service as described above, the traffic accident occurrence information and the location information corresponding to the traffic accident occurrence information may be transmitted to the infrastructure facility or the following moving vehicle to prevent the secondary accident, thereby preventing the accident that may occur additionally in advance.

The computing apparatuses, the electronic devices, the processors, the units, the memories, and other components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for providing a traffic accident handling service for a traffic accident, the method comprising:
   acquiring state information of a personal mobility device via a sensor and a camera of the personal mobility device, the state information comprising impact level data and image data;
   analyzing, by the processor, the traffic accident based on the acquired state information;

receiving, by the processor, accident handling information corresponding to the traffic accident from a central management server, the accident handling information comprising information on handling of previously occurred traffic accidents; and generating, by the processor, accident handling guide information based on the accident handling information, the accident handling guide information comprises a percentage of fault calculation information based on the received information on handling of similar previously occurred traffic accidents from the central management server.

2. The method of claim 1, wherein the accident handling guide information comprises accident response guide information.

3. The method of claim 2, wherein the accident response guide information comprises movement instructions for navigating the personal mobility device from a location where the traffic accident has occurred to a safe zone.

4. The method of claim 2, wherein the accident response guide information comprises a real-time notification indicating whether a following personal mobility device is approaching the location where the traffic accident occurred, based on location and heading data acquired via the sensor.

5. The method of claim 1, wherein the accident handling information is transmitted from the central management server storing statistical data, image data, and resolution actions from previously occurred traffic accidents.

6. The method of claim 1, wherein the state information of the personal mobility device comprises data determined from a bumper sensor or airbag sensor.

7. The method of claim 1, wherein the state comprises location change data acquired from a GPS sensor of the personal mobility device.

8. The method of claim 1, wherein the state information comprises image data information of an area around the personal mobility device obtained via the camera.

9. The method of claim 1, wherein the state information comprises autonomous driving data of the personal mobility device, including driving mode and level at the time of the accident.

10. The method of claim 9, wherein the driving data comprises at least one of an indicator of whether the personal mobility device autonomously driven or a value corresponding to a predefined an autonomous driving level classification.

11. The method of claim 1, further comprising transmitting the traffic accident occurrence information, the location information corresponding to the accident, and the accident handling guide information via the wireless communication transceiver.

12. The method of claim 11, wherein the wireless communication includes at least one of a vehicle to infrastructure (V2I) scheme or a vehicle to infrastructure (V2X) scheme, wherein the traffic accident occurrence information, the location information, and the guide information are transmitted to a road control center in the V2I scheme, and wherein the traffic accident occurrence information and location information are transmitted to a following personal mobility device in the V2X scheme.

13. The method of claim 1, wherein the sensor comprises at least one of a bumper sensor, airbag sensor, tilt sensor, lidar sensor, or a GPS sensor, and wherein the personal mobility device comprises at least one of a vehicle, robot, or bike.

14. A system for providing a traffic accident handling service, the system comprising:

a sensor and a camera disposed in a personal mobility device; and a processor configured to:

analyze a traffic accident based on state information of the personal mobility device acquired via the sensor and the camera, the state information comprises impact level data and image data;

receive accident handling information corresponding to the traffic accident from a central management server, the accident handling information comprises information on handling of previously occurred traffic accidents;

generate accident handling guide information based on the accident handling information, the accident handling guide information comprises a percentage of fault calculation information based on the received information on handling of similar previously occurred traffic accidents from the central management server.

15. The system of claim 14, wherein the accident handling guide information comprises an accident response guide information.

16. The system of claim 15, wherein the accident response guide information comprises at least one of movement instructions for relocating the personal mobility device to a safe zone or a real-time notification that a following personal mobility device is approaching the location based on position sensor data.

17. The system of claim 14, wherein the accident handling information comprises data transmitted from the central management server, the data including at least one of statistical, image, or situational analysis information related to previously handled traffic accidents.

18. The system of claim 14, wherein the state information of the personal mobility device comprises at least one of impact level data determined via the sensor, location change data from a GPS sensor, image data of surroundings captured via the camera, or autonomous driving status data.

19. The system of claim 18, wherein the autonomous driving comprises at least one of an autonomous operation or a numerical value corresponding to an autonomous driving level classification.

20. The system of claim 14, wherein the sensor comprises at least one of a bumper sensor, airbag sensor, tilt sensor, lidar sensor, or GPS sensor, and wherein the personal mobility device comprises at least one of a vehicle, robot or electric bike.

* * * * *